(12) United States Patent
DeDecker

(10) Patent No.: US 6,362,282 B1
(45) Date of Patent: Mar. 26, 2002

(54) POLYMERS WITH HIGH VINYL END SEGMENTS

(75) Inventor: Mark N. DeDecker, North Canton, OH (US)

(73) Assignee: Firestone Polymers, LLC, Akron, OH (US)

( * ) Notice: Subject to any disclaimer, the term of this patent is extended or adjusted under 35 U.S.C. 154(b) by 0 days.

(21) Appl. No.: 09/675,595

(22) Filed: Sep. 29, 2000

(51) Int. Cl.⁷ ........................ C08F 255/08; C08F 257/02
(52) U.S. Cl. ........................ 525/271; 525/250; 525/319; 526/87; 526/136
(58) Field of Search ................................ 525/271, 250, 525/319; 526/87, 136

(56) References Cited

U.S. PATENT DOCUMENTS

| | | | |
|---|---|---|---|
| 3,140,278 A | | 7/1964 | Kuntz |
| 3,235,626 A | * | 2/1966 | Waack ..................... 525/271 |
| 3,363,659 A | | 1/1968 | Keckler et al. |
| 3,629,223 A | | 12/1971 | Keckler |
| 3,829,409 A | | 8/1974 | Sommer et al. |
| 3,830,880 A | | 8/1974 | LaMarc |
| 4,107,236 A | | 8/1978 | Naylor et al. |
| 4,230,841 A | | 10/1980 | Prudence |

* cited by examiner

Primary Examiner—James J. Seidleck
Assistant Examiner—Olga Asinovsky
(74) Attorney, Agent, or Firm—David G. Burleson; Scott A. McCollister

(57) ABSTRACT

A polymer composition comprising at least two end segments that make up less than 15% of the total polymer composition. Each end segment has a vinyl content greater than about 45%. However, the vinyl content is less than about 35% throughout the remainder of the polymer composition.

22 Claims, No Drawings

POLYMERS WITH HIGH VINYL END SEGMENTS

FIELD OF THE INVENTION

The invention relates to polymer compositions with high vinyl end segments and methods for their preparation.

BACKGROUND

Polymers and copolymers of conjugated dienes such as polybutadiene, polyisoprene, and styrene-butadiene rubbers possess physical properties which make them suitable for many important applications such as synthetic rubbers and as additives to other polymeric systems such as, for example, high impact polystyrene (HIPS). Moreover, HIPS can be manufactured by polymerization of styrene in the presence of 5–10% dissolved polybutadiene or butadiene copolymer rubber. Early in the polymerization, phase separation begins because of the immiscibility of the rubber within the polystyrene being formed and the depletion of the styrene phase. Grafting of polybutadiene with the polystyrene then takes place. Toughness, as well as other mechanical and rheological properties of HIPS, is strongly affected by the nature of the rubber phase. In this regard, some of the characteristics of the rubber which may be modified to control the overall HIPS performance include concentration, volume, particle size, grafting and crosslinking ability, molecular weight, viscosity, and vinyl content. More particularly, it is often desirable to have high vinyl content in the end segments. High vinyl polymers contain alkenyl groups pendant to the polymer backbone as opposed to a cis/trans configuration of alkenyl groups within the polymer backbone. High vinyl end segments are often desirable in a polymer because high vinyl configurations have a higher grafting efficiency than cis/trans configurations.

Polymers with high vinyl end segments have been produced by initiating polymerization and allowing the reaction to proceed to near completion. As the polymerization reaction approaches completion, additional monomer and a vinyl modifier are added. The final segment of the polymer thus has a higher vinyl content than the beginning segment. The vinyl concentration of the end segment can be controlled to levels as high as about 70%. However, if one wishes both ends of the polymer, or the ends of a star branched polymer, to have high vinyl content with the remaining segments having low vinyl content, this method will not work because coupling reactions result in high vinyl in the center of the polymer chain or star branched polymer. Making polymers with high vinyl end segments on all or some of the polymer chains and low vinyl content throughout the remainder of the polymer structure remains desirable.

SUMMARY OF THE INVENTION

In an exemplary embodiment of this invention, a polymer composition including at least two end segments which include less than 15% of the total polymer composition is provided. Each of the end segments has a vinyl content greater than about 45%, more preferably greater than about 50%. In contrast, the remainder of the polymer has a vinyl content of less than about 35%. This polymer composition is formed by producing, via living anionic polymerization in the presence of a vinyl modifier, a living prepolymer high vinyl initiator having a relatively low molecular weight (less than about 2500) and a high vinyl content (greater than about 45%, more preferably greater than about 50%). The living prepolymer high vinyl initiator is subsequently used to initiate a second living polymer chain containing less vinyl modifier than the living prepolymer high vinyl initiator. The second living polymer chain with a high vinyl content in the beginning segment is then coupled to at least one other living polymer chain with a high vinyl content in the beginning segment. This coupling results in a polymer chain with two or more ends having high vinyl content. Typically, the high vinyl ends will make up less than about 5% of the coupled polymers total weight.

In a further exemplary embodiment, a polymer with end segments of high vinyl concentration greater than about 45%, more preferably greater than about 50%, is provided with a linear, branched, or star-shape. The use of di- and multi-functional coupling agents can produce these alternate shapes.

In yet another exemplary embodiment, a polybutadiene polymer is made having end groups of greater than about 45% vinyl concentration, more preferably greater than about 50%, and a vinyl concentration less than about 35% throughout the remainder of the polymer.

In another exemplary embodiment, a styrene-butadiene block copolymer is formed with end segments having a vinyl content greater than about 45%, more preferably greater than about 50%.

DETAILED DESCRIPTION OF THE INVENTION

The present invention relates to a coupled polymer composition including at least two end segments of high vinyl content prepared by living anionic polymerization, via batch or continuous polymerization. The polymer composition is provided with more than one high vinyl end segment by coupling two or more different polymer chains to each other. The polymer composition includes polymers which are linear, branched, or star-shaped, depending on the coupling agent used.

The polymer compositions of the present invention are formed by living anionic polymerization. Living polymerizations are polymerizations in which propagating centers do not undergo either termination or transfer. After 100% conversion is reached, additional polymerization takes place by adding more monomer to the reaction system. The added monomer is also polymerized quantitatively. Such polymerizations offer the potential for producing structures with defined end groups and block copolymers.

Three steps may be employed in the process of forming the present polymer compositions:

1. Preparation of a living prepolymer initiator having a high concentration of vinyl-configured butadiene units,
2. Preparation of polymers with high vinyl end segments utilizing the living prepolymer initiator, and
3. Coupling of the high vinyl end segment polymers.

To make this product in a continuous mode, the living prepolymer high vinyl initiator is made continuously in one reactor and fed to a second reactor where the bulk of the polymer is made. This continuous product can then be sent to a third device such as a reactor or mixer, preferably a reactor, where a coupling agent is introduced to react with the live polymer end. The coupling agent can be difunctional or higher.

Preparation of the living prepolymer high vinyl initiator is carried out by adding an initiator to a mixture of monomers in the presence of a vinyl modifier. Any initiator known in the art as suitable for the polymerization of conjugated dienes may be used. Preferred initiators include anionic initiators, and the most preferred are organo-lithium initiators. Preferred organo-lithium compounds have the formula RLi$_x$, wherein R represents a hydrocarbyl radical of about 1 to about 20, preferably about 2 to about 8 carbon atoms per R group and x is an integer from 1 to about 4. Typical R groups include aliphatic and cycloaliphatic groups. Specific examples of R groups for substitution in the above formulas include primary, secondary, and tertiary groups, such as n-propyl, isopropyl, n-butyl, isobutyl, t-butyl, etc., and mixtures thereof A preferred initiator for the present invention is n-butyl lithium.

Specific examples of other suitable lithium initiators include p-tolyllithium, 4-phenylbutyl lithium, 4-butylcyclohexyl lithium, lithium dialkyl amines, lithium dialkyl phosphines, lithiumalkyl aryl phosphine, lithium diaryl phosphines and mixtures thereof The amount of initiator used depends on the amount of monomer used and the molecular weights desired in the respective products. Under ideal conditions, where the polymerization system is free of impurities that can deactivate a portion of the initiator, the amount of initiator is determined by the amount of monomer being used for the initial block and the molecular weight desired in that block. Generally, in such polymerizations, each initiator molecule is responsible for the initiation of one polymer chain. Then for subsequent blocks, sufficient monomer is added in each case to form the desired molecular weight in the respective blocks in accordance with the number of atoms of initiator present in the polymer being formed. An exemplary amount of initiator in the present invention is between about 0.1% and about 15%.

Initiator is added to a mixture of monomers in a suitable hydrocarbon solvent in the presence of a vinyl-modifier. Preferred monomers are conjugated dienes. Suitable conjugated dienes include one or more of 1,3-butadiene, isoprene, 2,3-dimethyl-1,3-butadiene, and 1,3-pentadiene. Preferred conjugated dienes include 1,3-butadiene and/or isoprene.

Preferred solvents used in the preparation of the living prepolymer high vinyl initiator are hydrocarbon solvents such as pentane, hexane, heptane, octane, nonane, decane, cyclopentane, cyclohexane, cycloheptane, cyclooctane, and mixtures thereof.

A vinyl modifier is added to increase the 1,2-addition reaction of the diene monomer in the preparation of the living prepolymer high vinyl initiator. Such modifying agents are known in the art. These modifying agents may be employed in amounts generally ranging from about 1:100 to about 100:1 molar ratio of the modifier to anionic initiator. This yields a living prepolymer with molecular weight of about 500 to about 5,000. The 1,2-addition product can be increased from about the 5–15% range to as high as about 90% of the diene monomer units being incorporated into the living prepolymer high vinyl initiator. Preferred vinyl content of the living prepolymer high vinyl initiator is greater than about 45%, more preferably greater than about 50%.

Exemplary vinyl modifiers include one or more of hexamethylphosphoric acid triamide, N,N,N',N'-tetramethylethylene idamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, and N-methylmorpholine.

The number average molecular weight ($M_n$) of the living prepolymer high vinyl initiator is in the range of about 100 to 10,000, preferably in the range of about 250 to 5000, and most preferably in the range of about 500 to 2500.

Polymers with one high vinyl end segment are prepared in the second step of the polymerization process. These polymers are preferably linear, and can contain more than one monomer unit, in a random or block configuration. To form polymers with one high vinyl end segment, the living prepolymer high vinyl initiator is added to a mixture of monomers in a suitable solvent. The living prepolymer high vinyl initiator initiates the polymerization of the monomers by continuing living anionic polymerization. Preferred monomer units are conjugated dienes and vinyl-substituted aromatic hydrocarbons. The reactive system contains a lower concentration of vinyl modifier than was used to prepare the living prepolymer high vinyl initiator; therefore, the vinyl content of the subsequent polymer is of a relatively "low" vinyl content. For example, the vinyl content of this portion is less than 35%, preferably less than 30%.

Suitable conjugated dienes include one or more of 1,3-butadiene, isoprene, 2,3-dimethyl-1,3-butadiene, and 1,3-pentadiene. Preferred conjugated dienes are 1,3-butadiene and/or isoprene.

Suitable vinyl-substituted aromatic hydrocarbons include one or more of styrene, α-methylstyrene, 1-vinyl naphthalene, 2-vinyl naphthalene, 1-α-methy vinyl naphthalene, 2-α-methyl vinyl naphthalene, as well as alkyl, cycloalkyl, aryl, alkaryl, and aralkyl derivatives thereof, in which the total number of carbon atoms in the combined hydrocarbon is generally not greater than 12, as well as any di- or tri-vinyl substituted aromatic hydrocarbons. One preferred vinyl-substituted aromatic hydrocarbon is styrene. If the di- or tri-vinyl substituted aromatic hydrocarbons are used, the resulting polymer has a branched and/or crosslinked structure.

Suitable solvents in this step include one or more of pentane, hexane, heptane, octane, nonane, decane, cyclopentane, cyclohexane, cycloheptane, cyclooctane.

The polymerization temperature can vary over a broad range from about –20° C. to about 140° C. The pressure used preferably is sufficient to maintain the fluidity of the substantially liquid phase under the conditions of the polymerization reaction.

The polymerization reaction is generally conducted for a time sufficient to obtain at least about 80% and preferably about 99% conversion. More specifically, the polymerization is preferably carried out until at least 90% of the charged monomer has been polymerized. The $M_n$ of the uncoupled polymer is in the range of about 20,000 to 500,000, more preferably in the range of about 30,000 to 400,000, and most preferably in the range of about 40,000 to about 300,000.

The living prepolymer high vinyl end segment accounts for less than about 15% of the total weight of the polymer composition, preferably less than about 10% of the total weight, and most preferably less than about 5%. Therefore, the vinyl content of the living prepolymer high vinyl end segment has very little effect on the total vinyl content of the polymer composition. The preferred vinyl content of the total polymer composition is less than about 35%, and preferably less than about 30%.

The resultant polymer of the second step of the polymerization process is a living polymer with one high vinyl end segment. This living polymer is then coupled to other living polymers in the third step of the polymerization process. A wide variety of coupling agents can be used to couple the living polymers. A di-coupling agent will result in a linear polymer with both end segments having high vinyl content. A tri-coupling agent will result in a star-shaped polymer with all three end segments having high vinyl content, and a tetra-coupling agent will result in a star-shaped polymer with all four end segments having high vinyl content.

Suitable coupling agents include $SnCl_4$, alkyl $SiCl_3$, or an alkane dichloride of 1–10 carbon atoms, $CO_2$, $CCl_4$, $SiCl_4$, $PNCl_2$, divinylbenzene, butyl benzoate, $CCl_3COOEt$, and mixtures thereof.

The appropriate amount of coupling agent is calculated based on the amount needed to react with the number of initiator atoms present in the polymer. For example, with a tetrafunctional coupling agent, such as $SnCl_4$, one-fourth of the molecular weight of $SnCl_4$ is calculated as required for each atom of initiator present. As a by-product, the initiator, e.g., $Li^+$, is removed by reaction with chlorine and precipitated from the reaction solution as $LiCl$.

Other additives known in the art can be added. Stabilizers, antioxidants, conventional fillers, reinforcing agents, reinforcing resins, pigments, fragrances, and the like are examples of some such additives. Specific examples of useful antioxidants and stabilizers include 2-(2'-hydroxy-5'-methylphenyl) benzotriazole, nickel di-butyl-di-thiocarbamate, tris(nonylphenyl) phosphite, 2,6-di-t-butyl-4-methylphenol, and the like. Exemplary conventional fillers and pigments include silica, carbon black, titanium dioxide, iron oxide, and the like. These compounding ingredients are incorporated in suitable amounts depending upon the contemplated use of the product, preferably in the range of 1–350 parts by weight of additives or compounding ingredients per 100 parts by weight of the polymer composition.

A reinforcement may be defined as the material added to a resinous matrix to improve the strength of the polymer. Most reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion, and processability.

The polymer compositions of the present invention are useful as additives in the preparation of high impact polystyrene. They are also useful when blended with polycarbonates or in acrylonitrile-butadiene-styrene terpolymers (ABS rubber). Impact strength of other systems is often improved when blended with ABS rubber, and high impact polystyrene blended with polyphenylene oxide has improved toughness and processability.

The present invention will be described in more detail with reference to the following examples. The following examples are presented for purposes of illustration only and are not to be construed in a limiting sense.

EXAMPLES

Examples 1–2: Preparation of the Living Prepolymer High Vinyl Initiator

Example 1

A 750 mL reaction vessel was charged with 23 g hexane, then purged with nitrogen. 227 g 22% butadiene in hexane was then added to the reaction vessel, followed by the addition of 107 g n-butyl lithium catalyst in hexane (3% n-butyl lithium in hexane) and 4.577 mL bis-oxalanyl propane (15% in hexane). The reaction vessel was then placed into a water bath and agitated for two hours at room temperature. The resulting product had a vinyl content of ~58%. The $M_n$ was 1,000.

Example 2

A 38 L reaction vessel, vented and purged, was charged with 308 g hexane. 4.12 kg 22% butadiene in hexane was then added to the reaction vessel, followed by the addition of 1.942 kg of n-butyl lithium catalyst in hexane (3% n-butyl lithium in hexane) and 112 g bis-oxalanyl propane (15% in hexane). After 60 minutes, the temperature was raised to 32° C. The temperature was then raised to 57° C. and allowed to stand at that temperature for 24 hours before being cooled and stored. The resulting product had a vinyl content of ~68%. The $M_n$ was ~1,000.

Examples 3–12: Polybutadiene of Various Molecular Weights with Beginning High Vinyl Segments To a 38 L reaction vessel vented to <about 170 kPa (10 psig) were added varying amounts of hexane, A; the vessel was again vented to <about 170 kPa. Various amounts of a 22% solution of butadiene in hexane, B, was added and the temperature was stabilized to temperature $T_1$. Varying amounts of the living prepolymer high vinyl initiator (product of either Example 1 or 2), C, were added, sometimes along with 50 g hexane, and the temperature of the vessel was set to temperature $T_2$ to initiate reaction.

In Examples 3–6, after 30 minutes, the jacket temperature was set to temperature $T_3$ because the reaction had not reached the desired reaction temperature, $T_4$; in Examples 7–12, the reaction temperature was raised to $T_4$ and held for 30 minutes. The vessel was cooled to 21° C. (after the reaction temperature had reached maximum reaction temperature $T_5$ in Examples 3–6).

Varying amounts of isopropanol, D, were added to stop polymerization. (In Examples 4–6, the isopropanol was in 100 g hexane and, after the isopropanol charge in Examples 4 and 6, 50 g hexane also was added.) After the batch had cooled, varying amounts of the polymerization product, E, were mixed with varying amounts of Irganox™ 1520 L antioxidant, F, (Ciba Specialty Chemicals), Irganox™ 1076 antioxidant, G, (Ciba) and distilled water, H.

The vinyl content and $M_n$, for each polymer were determined.

The amounts of various reagents, reaction conditions, etc., used in the various polymerizations as well as the approximate vinyl content and $M_n$ determinations for each resulting polymer are shown below in Table 1.

TABLE 1

| Example | 3 | 4 | 5 | 6 | 7 | 8 | 9 | 10 | 11 | 12 |
|---|---|---|---|---|---|---|---|---|---|---|
| A (kg) | 6.4 | 3.2 | 3.2 | 3.2 | 3.2 | 2.6 | 2.6 | 32.6 | 3.1 | 3.1 |
| B (kg) | 10.5 | 13.6 | 13.6 | 13.6 | 14 | 16.5 | 16.5 | 16.5 | 14.5 | 14.5 |
| C (g) | | | | | | | | | | |
| type, Ex. 1 or 2 | 1 | 1 | 1 | 1 | 2 | 2 | 2 | 2 | 2 | 2 |
| amount (g) | 122 | 122 | 111 | 103 | 122 | 162 | 162 | 116 | 168 | 191 |

TABLE 1-continued

| Example | 3 | 4 | 5 | 6 | 7 | 8 | 9 | 10 | 11 | 12 |
|---|---|---|---|---|---|---|---|---|---|---|
| Hexane? (Y/N) | N | Y | N | Y | N | N | N | N | N | N |
| D (mL) | 1.21 | 1.21 | 1.10 | 1.01 | 1.556 | 2.092 | 2.092 | 2.092 | 3.112 | 2.223 |
| E (kg) | 11.4 | 11.4 | 10 | 10 | 10 | 10 | 10 | 10 | 10 | 10 |
| F (g) | 1.48 | 1.48 | 1.48 | 1.48 | 0.894 | 0.943 | 0.943 | 0.945 | 0.894 | 0.892 |
| G (g) | 0 | 0 | 0 | 0 | 3.578 | 3.773 | 3.773 | 3.781 | 3.575 | 3.567 |
| H (mL) | 300 | 0 | 300 | 300 | 0 | 0 | 0 | 0 | 0 | 0 |
| $T_1$ (° C.) | 24 | 24 | 24 | 24 | 32 | 32 | 32 | 32 | 38 | 38 |
| $T_2$ (° C.) | 44 | 45 | 49 | 49 | 49 | 54.5 | 54.5 | 54.5 | 60 | 60 |
| $T_3$ (° C.) | 54.5 | 54.6 | 54.5 | 54.5 | n/a | n/a | n/a | n/a | n/a | n/a |
| $T_4$ (° C.) | 66 | 66 | 66 | 88 | 93 | 93 | 93 | 93 | 94 | 94 |
| $T_5$ (° C.) | 71 | 71 | 83 | 88 | n/a | n/a | n/a | n/a | n/a | n/a |
| Vinyl content (%) | 22 | 23 | 18 | 21 | 26 | 25 | 26 | 26 | 15 | 24 |
| $M_n$ target | 200K | 200K | 220K | 240K | 200K | 170K | 170K | 170K | 100K | 140K |
| $M_n$ Actual | | 202K | 234K | 237K | 255K | 335K | 305K | 603K | 154K | 235K |

Examples 3–12 demonstrate an effective procedure for forming polymers with high vinyl beginning segments. These polymers may then be coupled as shown in examples 13–14.

Examples 13–14

Coupled Polymers with High Vinyl End Segments

To a 38 L reaction vessel vented to <about 170 kPa (10 psig) was added 3.2 kg hexane, A; the vessel was again vented to <about 170 kPa. 13.6 kg 22% butadiene in hexane was added and the temperature was stabilized to 24° C. Varying amounts of living prepolymer high vinyl initiator (product of example 2), I, were added (followed by 50 g hexane in Example 13) and the temperature of the reaction vessel was set to 49° C. to initiate reaction.

The reaction temperature was exothermically raised to 82° C. and allowed to remain at that temperature for 5 minutes. A coupling agent (butyl benzoate in Example 13, $SiCl_4$ in Example 14), J, was added to couple the polymers. After 10 minutes, the reaction was cooled to 21° C. and isopropanol (1.79 mL in 100 mL of hexane followed by a charge of 50 g hexane in Example 13; 4.39 mL (neat) with no subsequent hexane charge for Example 14) was added to stop polymerization.

After the batch had cooled, 10 kg of the reaction product was mixed with 300 mL water for 15 minutes. Varying amounts of Irganox™ 1520 L antioxidant, K, were added, and the resulting blend was stirred for 15 minutes.

The vinyl content and $M_n$ (both before and after coupling) for each polymer were determined. The coupled polymer in Example 13 had a linear structure (due to the difunctionality of butyl benzoate) while the coupled polymer in Example 14 had a star-shaped structure (due to the tetrafunctionality of the $SiCl_4$).

The amounts of various reagents, reaction conditions, etc., used in the various polymerizations as well as the approximate vinyl content and $M_n$ determinations for each resulting polymer are shown below in Table 2.

TABLE 2

| Example | 13 | 14 |
|---|---|---|
| I (g) | 176 | 420 |
| J (g) | 47.343 | 48 |
| K (g) | 1.473 | 1.453 |
| Vinyl content (%) | 19 | 24 |

TABLE 2-continued

| Example | 13 | 14 |
|---|---|---|
| $M_n$ | | |
| pre-coupling | 135 K | 55 K |
| post-coupling | 250 K | 220 K |

Examples 13–14 demonstrate a method for preparing coupled polymers with high vinyl end segments. Example 13 is a linear polymer, and example 14 is a star-shaped polymer.

Examples 15–16: Continuous Polymerizations

A continuous polymerization was carried out by adding n-butyl lithium (3% in hexane) at a rate of 0.45 kg/hr, hexane at a rate of 1.3 kg/hr, 22% butadiene in hexane at a rate of 1.3 kg/hr, and a vinyl modifier at a rate of 0.01 kg/hr to a reaction vessel to form the living prepolymer high vinyl initiator. The living prepolymer initiator was fed into a second reaction vessel as formed, along with 22% 1,3-butadiene at a rate of 103 kg/hr and hexane at a rate of 33 kg/hr.

After the resultant living polymer had reached a relatively high weight average molecular weight ($M_w$), it was fed to a third reaction vessel along with butyl benzoate at a rate of 0.03 kg/hr. The total reaction time was 53 minutes. The temperature was maintained at 99° C. for the duration of the reaction.

The approximate vinyl contents of the living prepolymer initiator portion of the polymer ($V_i$) as well as the total coupled polymer composition ($V_c$) were determined. These data are shown below in Table 3.

TABLE 3

| Example | 15 | 16 |
|---|---|---|
| $M_n$ | 112 K | 120 K |
| $M_w$ | 220 K | 230 K |
| $V_i$ (%) | 45–50 | 50–60 |
| $V_c$ (%) | 14 | 18 |

Examples 15–16 demonstrate a method for a continuous polymerization process to produce coupled polymers having high vinyl end segments.

Various modifications and alterations that do not depart from the scope and spirit of this invention will become apparent to those skilled in the art. This invention is not to be unduly limited to the illustrative embodiments set forth herein.

I claim:

1. A polymer composition comprising a first portion and at least two end segments, wherein said end segments comprise less than 15% of the polymer composition, said end segments having a vinyl content greater than about 45%, and said first portion having a vinyl content of less than about 35%.

2. The composition of claim 1 wherein said first portion and said end segments comprise monomer units chosen from conjugated dienes, vinyl-substituted aromatic hydrocarbons, and mixtures thereof.

3. The composition of claim 2 wherein said conjugated diene monomer units are chosen from 1,3-butadiene, isoprene, 2,3-dimethyl-1,3-butadiene, 1,3-pentadiene, and mixtures thereof.

4. The composition of claim 3 wherein said conjugated diene monomer units are chosen from 1,3-butadiene, isoprene, and mixtures thereof.

5. The composition of claim 2 wherein said vinyl-substituted aromatic hydrocarbon monomer units are chosen from styrene, α-methylstyrene, 1-vinylnaphthalene, 2-vinylnaphthalene, 1-α-methyl vinyl naphthalene, 2-α-methyl vinyl naphthalene, as well as alkyl, cycloalkyl, aryl, alkaryl, and aralkyl derivatives thereof, in which the total number of carbon atoms in the combined hydrocarbon is not greater than 12, as well as any di- or tri-vinyl substituted aromatic hydrocarbons.

6. The composition of claim 2 wherein said vinyl-substituted aromatic hydrocarbon monomer units comprise styrene.

7. The composition of claim 1 further comprising a coupling agent.

8. The polymer composition of claim 1 wherein said end segments comprise less than about 5% by weight of the polymer composition.

9. The composition of claim 1 wherein said polymer composition has a total vinyl content less than about 35%.

10. The composition of claim 1 wherein said polymer has a structure that is at least one of linear, branched, and star-shaped.

11. The composition of claim 1 wherein said end segments each have a $M_n$ between about 250 and 5000.

12. A process for producing a polymer with at least two high vinyl end segments comprising:
 a. forming a living prepolymer high vinyl initiator with a vinyl content greater than about 45%,
 b. initiating polymerization of monomers using said living prepolymer high vinyl initiator so as to form a polymer product, and
 c. coupling said polymer product of said polymerization.

13. The process of claim 12 wherein the formation of said living prepolymer vinyl initiator comprises combining an initiator, monomers, and a vinyl modifier.

14. The process of claim 13 wherein said initiator is an organo-lithium compound.

15. The process of claim 13 wherein the monomers of step (a) comprise one or more conjugated dienes.

16. The process of claim 13 wherein said vinyl modifier comprises at least one of hexamethylphosphoric acid triamide, N,N,N',N'-tetramethylethylene idamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyle ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, and N-methylmorpholine.

17. The process of claim 12 wherein said monomers comprise at least one of conjugated dienes and vinyl-substituted aromatic hydrocarbons.

18. The process of claim 12 wherein said coupling is performed using a coupling agent.

19. The process of claim 12 wherein said polymers have a structure that is at least one of linear, branched, and star-shaped.

20. The process of claim 12 wherein said living prepolymer high vinyl initiator has a $M_n$ between about 250 and 5000.

21. The polymer composition of claim 1 wherein the vinyl content of said first portion is greater than zero.

22. A polymer composition comprising a first portion including units selected from conjugated dienes, vinyl-substituted aromatic hydrocarbons and mixtures thereof, and at least two end segments including conjugated diene monomer units, wherein said end segments comprise less than 15% of the polymer composition, said end segments have a vinyl content greater than about 45%, and said first portion has a vinyl content of less than about 35%.

* * * * *